(12) United States Patent
Lopez et al.

(10) Patent No.: US 9,090,406 B2
(45) Date of Patent: Jul. 28, 2015

(54) MODULAR ACCUMULATION CONVEYOR

(75) Inventors: Rémy Lopez, Octeville-sur-Mer (FR); Zmaj Petrovic, Octeville-sur-Mer (FR); Pascal Walter, Octeville-sur-Mer (FR)

(73) Assignee: GEBO PACKAGING SOLUTIONS FRANCE, Reichstett (FR)

( * ) Notice: Subject to any disclaimer, the term of this patent is extended or adjusted under 35 U.S.C. 154(b) by 134 days.

(21) Appl. No.: 13/824,863

(22) PCT Filed: Sep. 19, 2011

(86) PCT No.: PCT/FR2011/052153
§ 371 (c)(1),
(2), (4) Date: Jul. 16, 2013

(87) PCT Pub. No.: WO2012/035280
PCT Pub. Date: Mar. 22, 2012

(65) Prior Publication Data
US 2013/0284563 A1    Oct. 31, 2013

(30) Foreign Application Priority Data
Sep. 17, 2010 (FR) ...................................... 10 03715

(51) Int. Cl.
| | |
|---|---|
| B65G 47/26 | (2006.01) |
| B65G 15/26 | (2006.01) |
| B65G 1/133 | (2006.01) |
| B65G 1/12 | (2006.01) |
| B65G 21/14 | (2006.01) |
| B65G 47/51 | (2006.01) |
| B65G 21/22 | (2006.01) |

(52) U.S. Cl.
CPC ................ *B65G 47/268* (2013.01); *B65G 1/12* (2013.01); *B65G 1/133* (2013.01); *B65G 15/26* (2013.01); *B65G 21/14* (2013.01); *B65G 21/22* (2013.01); *B65G 47/51* (2013.01); *B65G 47/5122* (2013.01); *B65G 47/5131* (2013.01)

(58) Field of Classification Search
CPC ...... B65G 47/51; B65G 47/268; B65G 21/14; B65G 21/22; B65G 1/133; B65G 1/12; B65G 15/26
USPC ........ 198/347.1, 459.1, 460.2, 594, 679, 812, 198/836.1
See application file for complete search history.

(56) References Cited

U.S. PATENT DOCUMENTS

| | | | |
|---|---|---|---|
| 4,513,858 A | 4/1985 | Fellner et al. | |
| 4,544,647 A * | 10/1985 | Fuentes et al. | ................. 502/115 |
| 7,455,168 B2 * | 11/2008 | Monti | ......................... 198/347.1 |
| 8,770,377 B2 * | 7/2014 | Seger et al. | ................. 198/347.4 |
| 2012/0024660 A1 * | 2/2012 | Seger et al. | ................. 198/347.1 |

FOREIGN PATENT DOCUMENTS

| | | |
|---|---|---|
| CA | 2364216 A1 | 7/2003 |
| EP | 0159074 A1 | 10/1985 |

(Continued)

*Primary Examiner* — Leslie A Nicholson, III
(74) *Attorney, Agent, or Firm* — Sughrue Mion, PLLC (57) ABSTRACT

An article (2) accumulation conveyor (1) having an endless conveying belt (9), characterized in that it comprises: a plurality of accumulation modules (14) having adjustable capacity, comprising independent frames (16), a device (53) for transferring the articles (2) from one accumulation module (14) to another (14), said device (53) being interposed between said modules (14); an endless conveying belt (9) common to the accumulation modules (14) and to the transfer device (53).

15 Claims, 8 Drawing Sheets

(56) References Cited

FOREIGN PATENT DOCUMENTS

| EP | 0325333 A1 | 7/1989 |
| GB | 2098568 A | 11/1982 |
| WO | 00/00415 A1 | 1/2000 |
| WO | 2004/035432 A1 | 4/2004 |

* cited by examiner

MODULAR ACCUMULATION CONVEYOR

CROSS REFERENCE TO RELATED APPLICATIONS

This application is a National Stage of International Application No. PCT/FR2011/052153 filed Sep. 19, 2011, claiming priority based on French Patent Application No. 10 03715, filed Sep. 17, 2010, the contents of all of which are incorporated herein by reference in their entirety The invention relates to the conveyance of articles such as containers. More specifically, it concerns a conveyor of articles that allows articles to be temporarily accumulated in a buffer storage area of adjustable capacity, depending on the needs of a production line.

The principle of variable capacity buffer storage has long been known. There are two principal architectures of accumulation conveyors: spiral architecture and plane architecture.

In spiral architecture, illustrated by patent EP 1 161 391 (Hartness), several conveyor strands are stacked to form a vertical storage area of several levels. The principal theoretical advantage of this architecture is the small footprint it requires with regard to the storage capacity allowed. However, this architecture is not without its disadvantages. Indeed, in practice, there are problems of reliability due to the length of the drive chains, the tension of the drive chains being a nonlinear but exponential function of the number of convolutions of the conveyor, and thus the number of levels. There is therefore a tendency to limit the capacity of these conveyors in order to limit the risk of breakage of the chains, to the detriment of the capacity/footprint ratio.

In plane architecture, illustrated by U.S. Pat. No. 4,413,734 (Mapatent), the articles follow a track also comprising convolutions but remaining in the same plane. In practice, the conveyor comprises a conveyor band comprising several adjacent rectilinear sections, the ends of which are connected by curved sections winding on transfer wheels. The accumulation capacity of the conveyor is adjusted by moving the transfer wheels.

Operators can prefer plane architecture to spiral architecture because of its greater reliability.

However, plane architecture accumulation conveyors, particularly of the type described in the Mapatent patent, are custom-built according to the accumulation need expressed by the operator. Thus, if the needs of the operator are reduced, the conveyor takes up too much space compared to the required accumulation capacity. On the other hand, if the accumulation needs increase, the entire conveyor must be replaced by a new, higher capacity installation. In both cases, operating costs are strained by the inadequacy of the conveyor compared to the actual needs of the operator.

The invention seeks to contribute a solution to this problem.

To that end, the invention proposes an accumulation conveyor of articles by endless conveyor band, formed by assembling:
  a plurality of independent adjustable-capacity accumulation modules, each comprising a frame defining two parallel tracks respectively for an advance strand and a return strand of the band;
  at least one transfer device connecting a track for a return strand of the band to a first accumulation module and a track for an advance strand of the band to a second module, adjacent to the first;
  an endless conveyor band common to the accumulation modules and to the transfer device.

In particular, this modular architecture makes it possible to produce an accumulation conveyor of variable form and/or capacity based on the needs of the operator.

According to a preferred embodiment, the accumulation modules are mounted on a common infrastructure; moreover, the frames of the accumulation modules can be removably attached to the infrastructure. Similarly, the transfer device can be removably attached to the modules.

In practice, the infrastructure comprises for example a plurality of cross members on which the frames of the accumulation modules rest, with legs being attachable to the ends of the cross members.

According to a particular embodiment, the accumulation modules extend along parallel directions. As a variant, the accumulation modules extend along non-parallel directions.

More specifically, each accumulation module comprises for example:
  two rectilinear sections,
  a movable carriage provided with a transfer wheel that is interposed between the rectilinear sections,
  a central belt extending between the rectilinear sections and parallel thereto, the belt being attached by at least one end to the movable carriage,
  a motor engaged with the belt to jointly drive the belt and the carriage in a linear movement with respect to the rectilinear sections, and thus to modify the accumulation capacity of the module.

According to a preferred embodiment, the endless conveyor band is guided laterally by the central belt.

According to a particular embodiment, the conveyor further comprises a lateral guide device of the band at a junction between a straight section and a curved section.

Said guide device is for example magnetic, and comprises at least one magnet situated at the level of metal parts of the band, passing in front of the magnet.

The position of the guide device is preferably adjustable in a longitudinal direction and a transverse direction.

The guide device comprises for example a magnet mounting clamp, one jaw of which has an edge against which the chain is applied and on which it slides.

According to a particular embodiment, the guide device is mounted on a plate integral with a support of a transfer wheel of the band.

Other objects and advantages of the invention will appear from the following description, provided with reference to the appended drawings in which.

Figure 1:
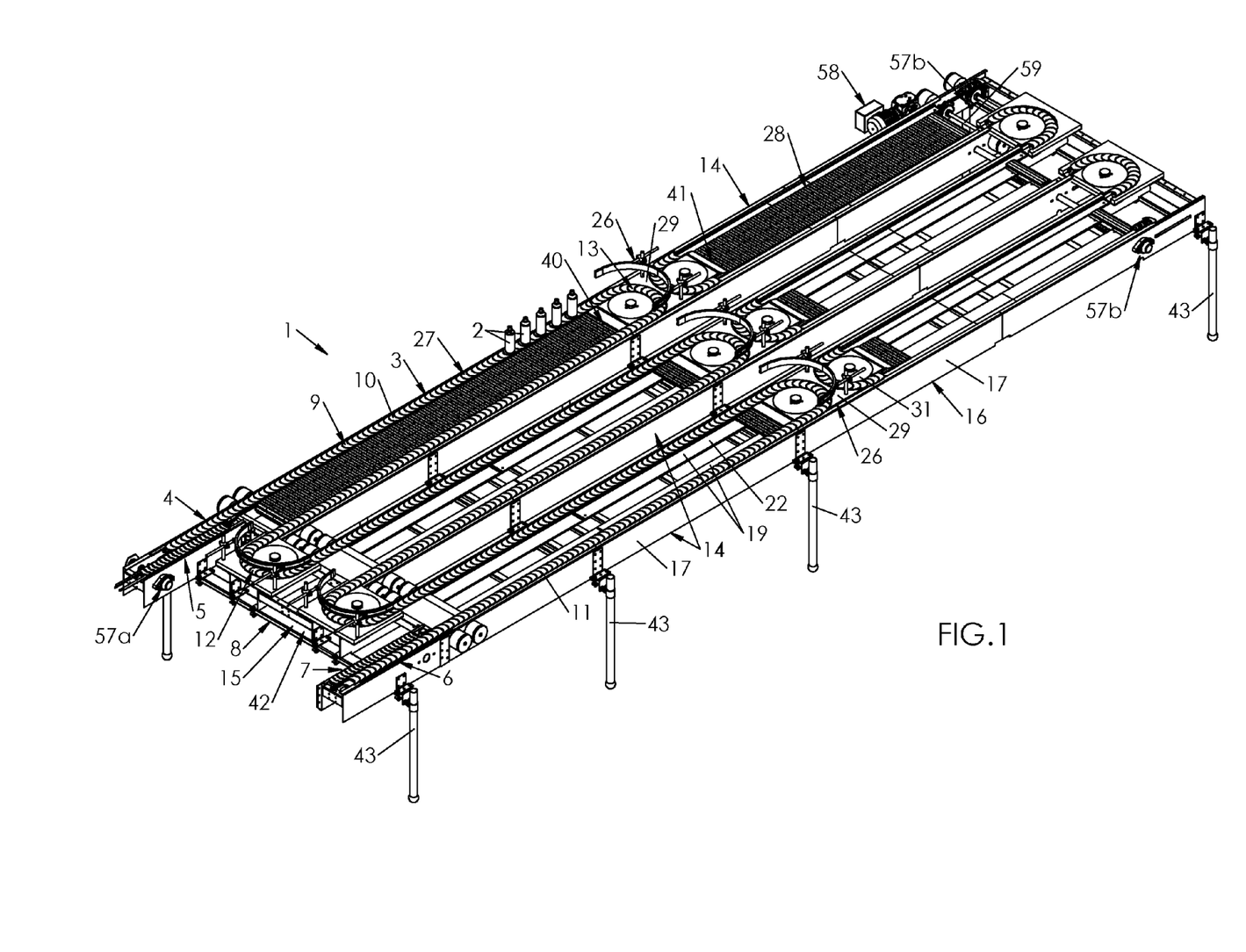
FIG. 1 is a view in perspective showing an accumulation conveyor comprising several juxtaposed accumulation modules.
Figure 2:
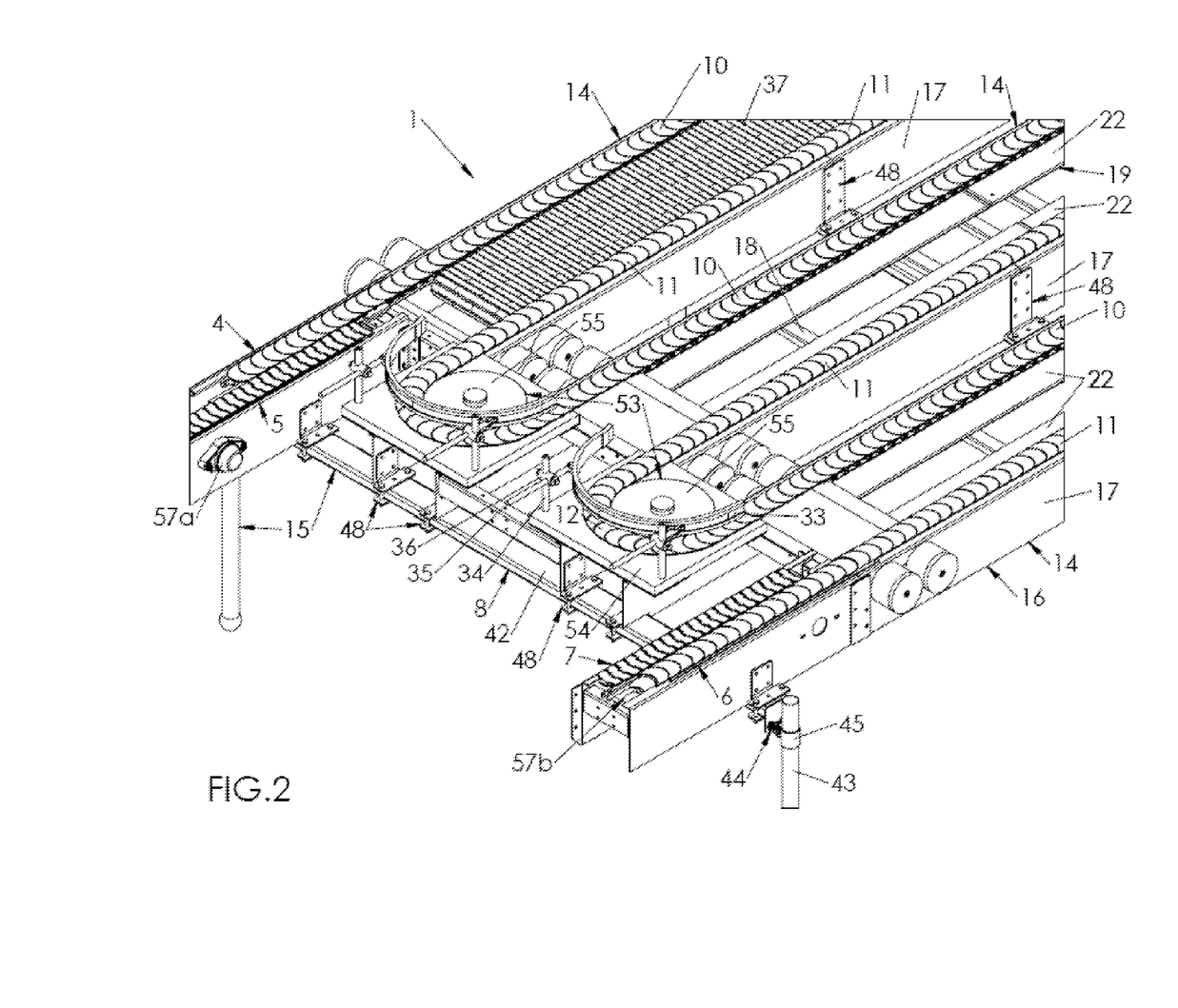
FIG. 2 is a view of a detail of the accumulation conveyor of FIG. 1.

Represented in FIG. 1 is an accumulation conveyor 1 arranged to temporarily accumulate articles 2 (particularly containers such as bottles) in buffer storage areas 3 of adjustable capacity.

The function of said accumulation conveyor 1—hereinafter simply called accumulator—is to compensate for potential variations in flow of the articles 2 between two machines disposed on a manufacturing and/or conveyor line of which it forms a local spur. To that end, the accumulator 1 comprises an intake 4, connected to a feed channel 5, by which the articles 2 enter the accumulator 1, and an outlet 6, connected to an evacuation channel 7, by which the articles 2 leave the accumulator 1. As can be seen in FIG. 1, the intake 4 and the outlet 6 of the accumulator 1 are both situated at the same end 8 (called front end) of the accumulator 1.

The accumulator 1 comprises an endless conveyor band 9 composed of a chain formed by a plurality of identical links 9.1 that are interconnected by means of two pins, a horizontal pin A and a vertical pin B, allowing them to pivot with respect to each other in two planes, respectively vertical and horizontal. The links 9.1 are preferably made of a plastic material with low coefficient of friction (for example Nylon® or ABS resin).

As can be seen in FIG. 1, the chain 1 comprises a series of parallel rectilinear sections 10, 11, connected at their ends by curved sections 12, 13 (in practice, they are semicircular).

The accumulator 1 has a modular design. To that end, it comprises a plurality (at least two; three in the example illustrated in the figures) of accumulation modules 14 that are similar, juxtaposed, and removably mounted on a common infrastructure 15.

Each module 14 comprises an independent frame 16 comprising two parallel side rails 17 defining a longitudinal direction. The side rails 17 are held together and at a constant separation by means of a series of regularly spaced cross members 18 defining a transverse direction.

The frame 16 of each module 14 further comprises a pair of spaced parallel slide rails 19, each extending along a side rail 17. Each slide rail 19 is mounted on the cross members 18 by means of an underlying plate 20 and attachment pads 21.

Figure 6:
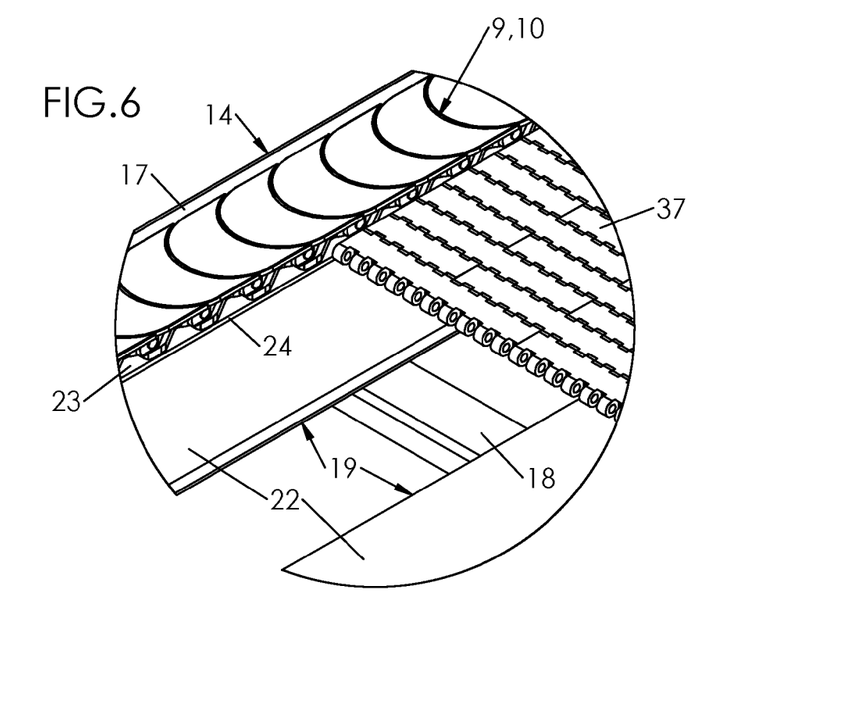
FIG. 6 is a view of another detail of the accumulation conveyor of FIG. 1.
Figure 7:
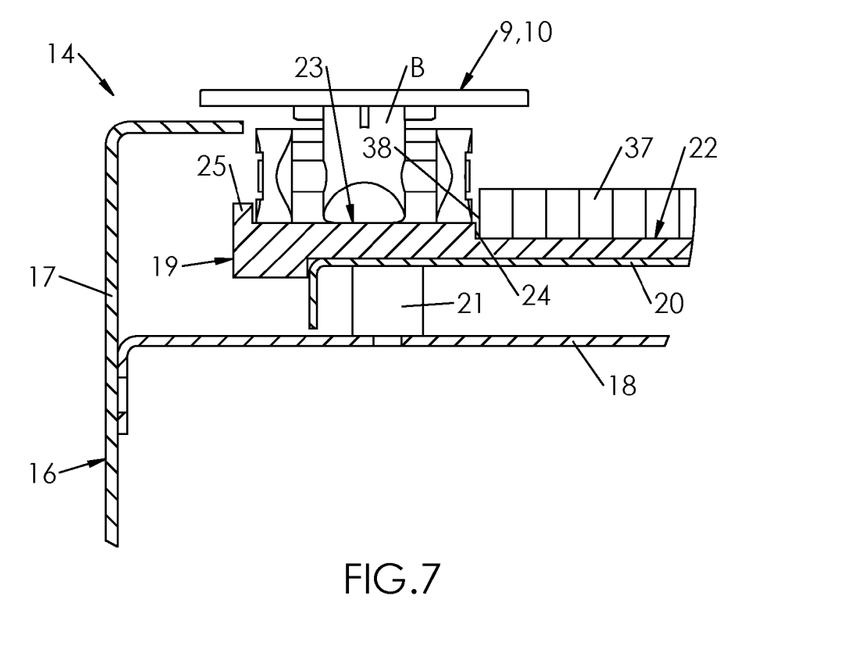
FIG. 7 is a view in cross-section showing a detail of the conveyor of FIG. 1.

As illustrated in FIGS. 6 and 7, each slide rail 19 has two adjacent parallel longitudinal sections, i.e., an inner section 22 and an outer section 23 raised with respect to the inner section 22, the two sections 22, 23 being separated by a shoulder 24. As can be clearly seen in FIG. 7, the outer section 23, intended to form a track accommodating a rectilinear section 10, 11 of the chain 9, is bordered toward the exterior (i.e., opposite the inner section 22) by a rib 25, which runs longitudinally all along the slide rails 19 to laterally guide the chain 9 in its translation movement.

Each module 14 is further equipped with a movable carriage 26 mounted on the slide rails 19, and separating the module 14 into a working area 27, situated on the side of the front end 8 and where the articles 2 actually circulate, and a passive area 28, situated opposite, free of articles.

The carriage 26 comprises a support plate 29 and a pair of transfer wheels, i.e., a front wheel 30, situated on the side of the working area 27 of the module 14, and a rear wheel 31, situated on the side of the passive area 28, both wheels mounted on the plate 29 in free rotation around vertical axes. The plate 29 is slidably mounted on the inner sections 22 of the slide rails 19; it is guided laterally on either side by the shoulders 24.

The diameter of each wheel 30, 31 is substantially equal to the separation between the shoulders 24 of the facing slide rails 19. Around each wheel 30, 31, the plate 29 defines a groove 32 in an arc of circle to receive and guide the chain 9 in a circular movement one-half turn around the wheel 30, 31.

Figure 3:
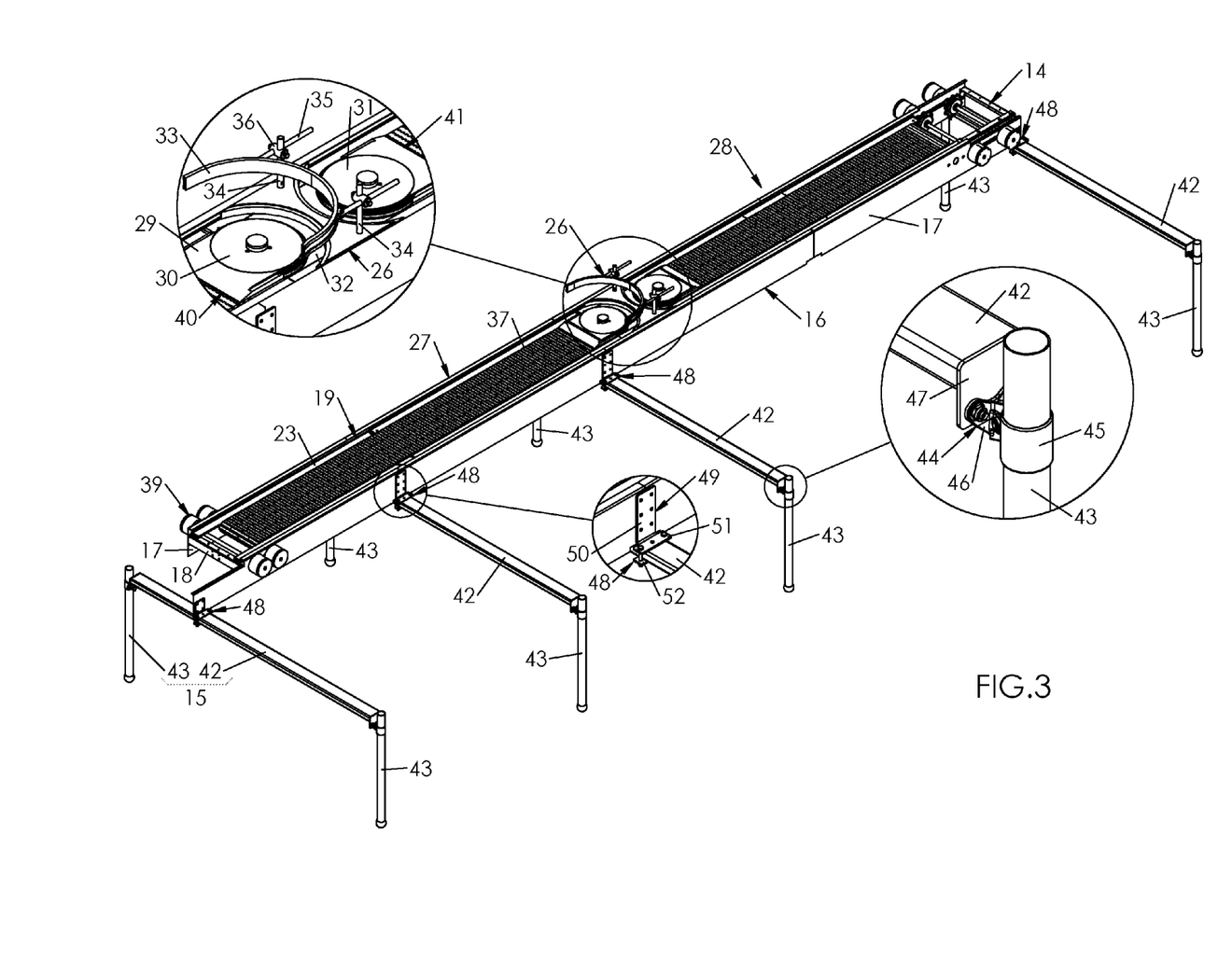
FIGS. 3 to 5 are views in perspective illustrating three successive steps of assembly of the conveyor of FIG. 1; also represented in FIGS. 3 and 5, in circles centered on certain parts of the conveyor, are details thereof.

As can be seen in FIG. 3, the carriage 26 also comprises a transfer guide 33, formed for example from a curved metal or plastic section, which extends above the front wheel 30 and is attached to the plate 29 by means of a pair of posts 34. The position of the guide 33 can be adjusted longitudinally by means of slides 35 attached to the posts 34 by boss heads 36 provided with adjustment screws.

Each module 14 further comprises a central belt 37 mounted on the slide rails 19. More specifically, the belt 37 rests on the inner sections 22 of the slide rails 19 while being guided laterally by the shoulders 24. As can be seen in FIG. 7, the thickness of the belt 37 is greater than the height of the shoulder 24, so that each of the lateral edges 38 of the belt 37 extends vertically beyond the upper surface of the outer section 23 that it adjoins, so as to laterally guide the chain 9 in its translation movement. This point is explained in more detail hereinafter.

The belt 37 is constructed of a plurality of links articulated with respect to each other around transversal horizontal axes, and which together form a substantially continuous surface, as can be clearly seen in FIG. 1, where only the belt 37 of the accumulation module 14 situated to the left is represented in its entirety, the belts 37 of the central module 14 and of the module 14 situated at the right being only partially represented to allow the internal structure of the modules 14 to be seen, and in particular the configuration of the slide rails 19.

The belt 37 circulates, at both ends of the module 14, over guide rollers, one of which (in this instance located at the rear end of the module 14) is motor-driven and the other (located at the front end) is an idler. An adjustment system 39 of the longitudinal position of the idler roller ensures that the belt 37 is under tension.

The belt 37 is looped over itself with the interposition of the movable carriage 26. More specifically, the belt 37 comprises a front end 40, by which it is attached to the carriage 26 on the side of the front wheel 30, and a rear end 41 by which the belt 37 is attached to the carriage 26 at the side of the rear wheel 31. Thus, the belt 37, attached to the carriage 26, drives said carriage in its movements and consequently constitutes the means of adjustment of the accumulation capacity of the module 14. A forward movement of the carriage 26 reduces the accumulation capacity, while a backward movement of the carriage 26 increases the accumulation capacity.

As illustrated in FIGS. 1 to 5, the infrastructure 15, on which the modules 14 rest, comprises a series of cross members 42 (formed in this instance by metal joists of rectangular cross-section) at each end of which a leg 43 is attached (formed in this instance by a metal tube).

As can be seen in detail in FIG. 3, each leg 43 is mounted at one end of the cross member by means of a one-piece attachment 44 comprising an adjustable ring 45 in which the leg 43 is secured, and a bracket 46 bolted to an end plate 47 of the cross member 42. An adjustment screw allows the ring 45 to be tightened or loosened in order to adjust the vertical position of the leg 43—and thus the height of the infrastructure 15.

As is clearly visible in FIG. 3, and more particularly in the central detail circle, the removable attachment of the modules 14 to the infrastructure 15 is provided by means of flanges 48 each comprising:

a bracket 49 having a vertical tab 50 attached to a side rail 17 and a horizontal tab 51;

a stirrup hanger 52 bolted to the horizontal tab 51 of the bracket 49 to secure a cross piece 42, thus ensuring the removable attachment of the module 14.

The accumulator 1 further comprises a device 53 for transfer of the chain 9 between adjacent modules 14. In the illustrated configuration, where the accumulator 1 comprises three parallel adjacent modules 14, two transfer devices 53 are provided, each inserted between two adjacent modules 14.

Each transfer device 53 comprises a support plate 54 and a wheel 55 mounted on the plate 54 in free rotation around a vertical axis. A semicircular groove 56 around the wheel 55 is made in the plate 54, to receive and guide the chain 9 in a circular movement of one-half turn of the wheel 55.

Figure 5:
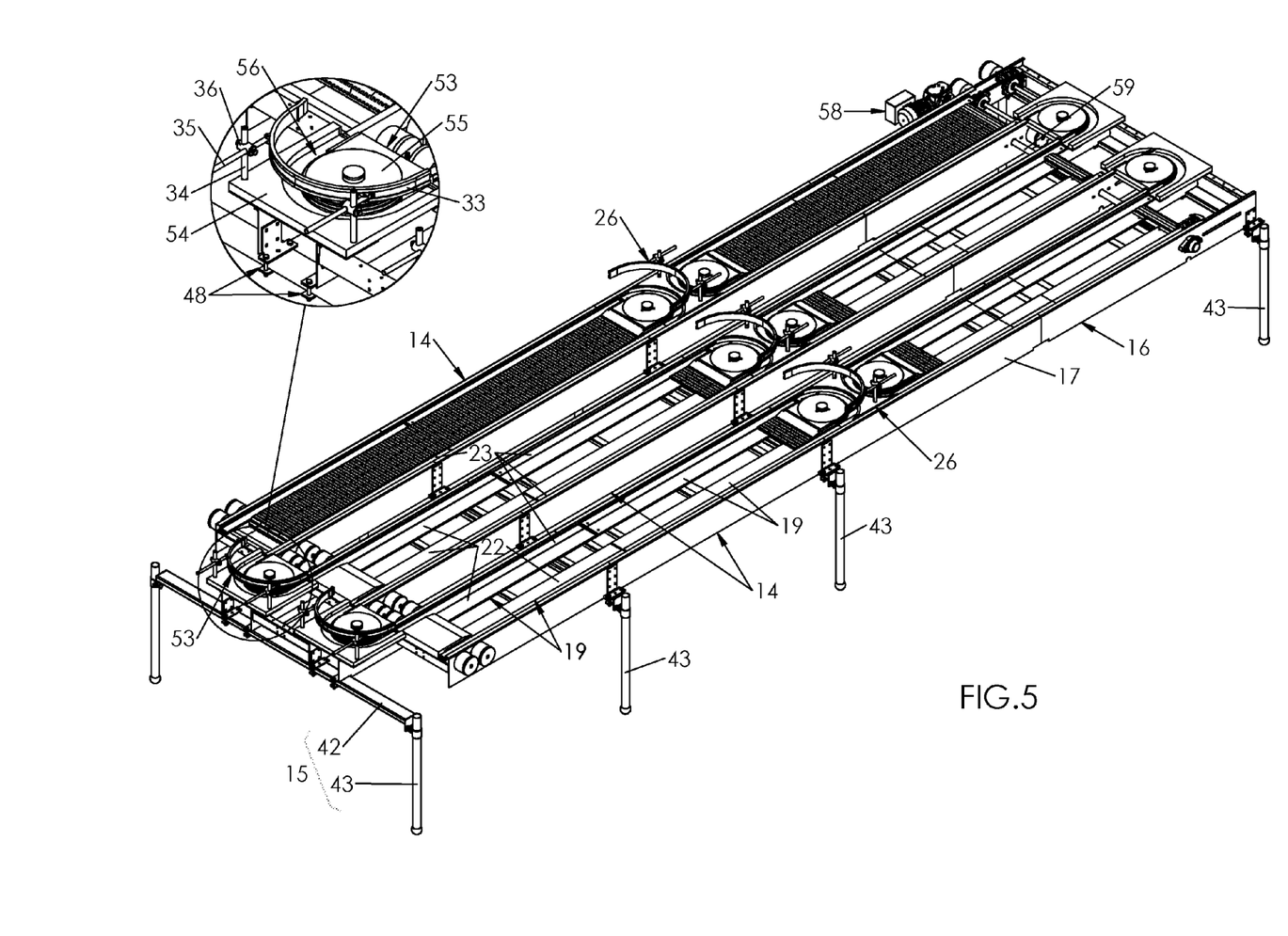

As can clearly be seen in FIG. 5, each transfer device 53 comprises a transfer guide 33, formed for example by a curved metal or plastic section, which extends above the wheel 55 and is attached to the plate 54 by means of a pair of posts 34. The position of the guide 33 can be adjusted longitudinally by means of slides 35 attached to the posts 34 by boss heads 36 provided with adjustment screws.

The transfer device 53 is inserted between two adjacent modules 14 at the front ends thereof. The transfer device 53 can be removably attached, either directly to the infrastructure (for example in the same way as the modules 14), or preferably to the modules 14 themselves. In the illustrated embodiment (see particularly FIGS. 2 and 5), the plate 54 of each transfer device 53 is attached to an end portion of the side rails 17 extending beyond the slide rails 19, so that the groove 56 is extended in line with the outer sections 23 of the slide rails 19.

Figure 4:
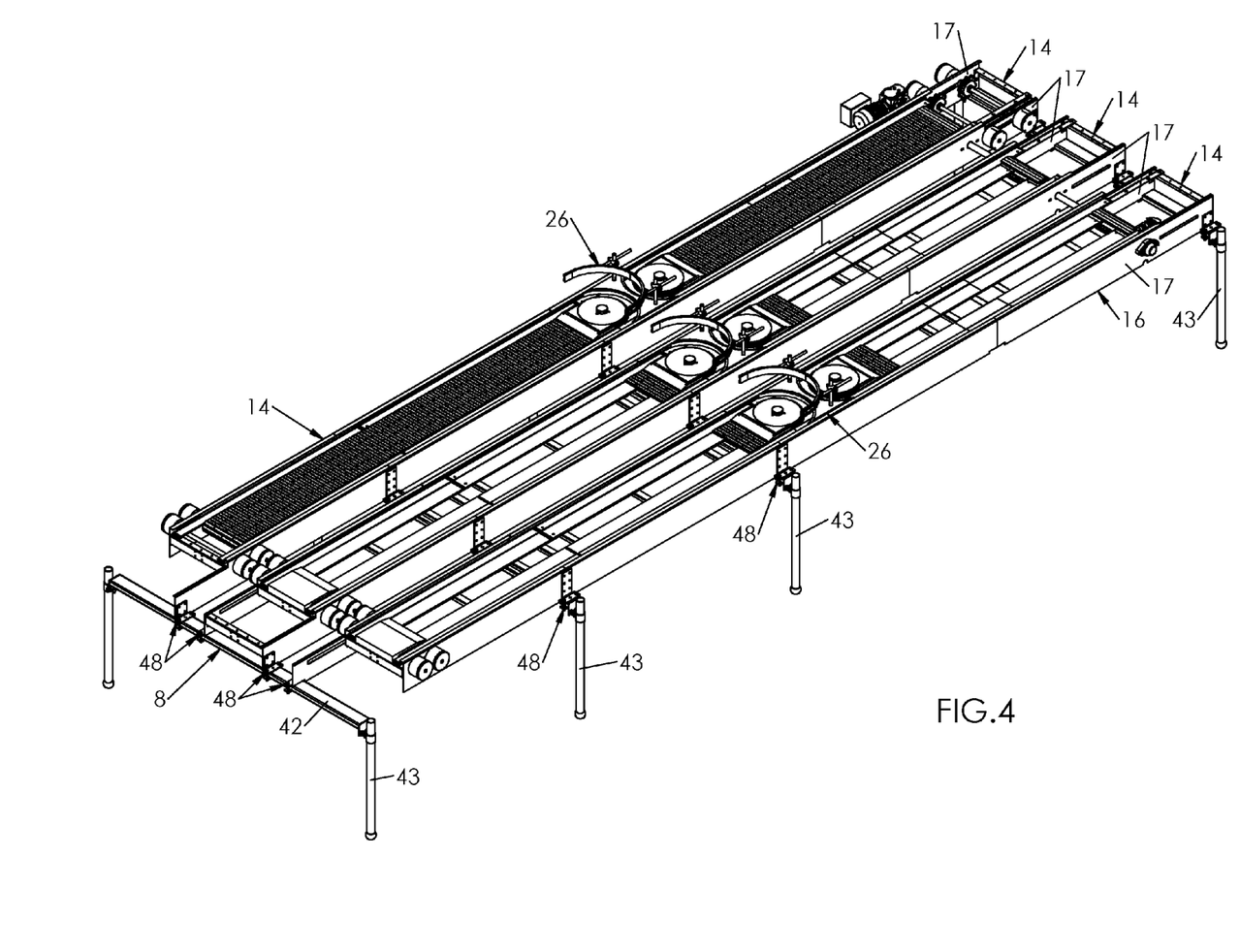

Represented in FIGS. 3 to 5, and in FIG. 1, are different successive steps of assembling the accumulator 1. A first step, represented in FIG. 3, consists of mounting a first module 14 (preassembled and therefore considered as being an indivisible unit for the needs of the assembly) on the infrastructure 15. To that end, the flanges 48 are attached to the cross members 42 by bolting the stirrup hangers 52 to the horizontal tabs 51 of the brackets 49, previously attached to the side rails 17.

In a second step, illustrated in FIG. 4, the other modules 14 are mounted on the infrastructure 15 in the same way as the first module 14, while ensuring that the separation between two adjacent modules 15 corresponds to a predetermined value that enables the assembly, at the ends of the modules 14, of the transfer devices 53. Said assembly is allowed and facilitated by the independence of the frames 16 of the modules 14.

In a third step, illustrated in FIG. 5, each transfer device 53 is assembled by attaching its plate 54 astride the side rails 17 of two adjacent modules 14, while ensuring that the groove 56 is located in line with the outer sections 23 of the slide rails 19 that are therefore connected by the groove 56.

A last step, illustrated in FIG. 1, consists of assembling the chain 9, of which there is only one for the entire accumulator 1, and is therefore common to the accumulation modules 14 and to the transfer devices 53, and of connecting the accumulator 1 to the feed channel 5 (connected to the first module 14, at the left of FIG. 1) and to the discharge channel 7 (connected to the last module 14, at the right of FIG. 1).

The rectilinear sections 10, 11 of the chain 9 respectively form, in each module 14, an advance strand and a return strand circulating in opposite direction on the tracks formed by the outer sections 23 of the slide rails 19. The advance strand 10 and the return strand 11 of the same module are connected at their rear ends by the curved section 13, which circulates in the groove 32 by winding around the front wheel 30 and making the articles follow a half-turn between the strands 10, 11. The return strand 11 of a first module 14 and the advance strand of a second adjacent module 14 are connected at their front ends by the curved section 12 of the chain 9, which circulates in the groove 56 by winding around the wheel 55 and making a half-turn of the chain 9 between the return strand 11 of the first module 14 and the advance strand 10 of the second module 14.

In each rectilinear section, the chain is doubly guided laterally:
outwards, by the rib 25;
inwards, by one edge 38 of the belt 37, which is inserted between the rectilinear sections 10, 11 of the chain 9.

The chain 9 is driven by a motor 57*a* disposed (as can be seen in FIG. 1) at a front end of the first module 14, connected to the feed channel 5), while three guide rollers 57*b*, mounted at the front and rear ends of the last module 14 as well as at the rear end of the first module 14, together ensure the looped return of the chain 9.

The accumulation capacity of the modules 14 can be adjusted either independently, or, as in the illustrated embodiment, jointly by means of a single motor 58 driving in rotation a transverse motor shaft 59 common to the modules 14, driving all of the belts 37 (by means of winding on rollers or sprocket wheels). In this way, the rotation of the shaft 59 in a first direction jointly moves the belts 37 and the carriages 26 in a linear movement towards the front end 8 of the accumulator 1, which reduces the length of the rectilinear sections 10, 11 of the chain 9 in the working areas 27 that together form the storage area 3 (while symmetrically increasing it in the passive areas 28), thus reducing the accumulation capacity. On the contrary, the rotation of the shaft 59 in the opposite direction moves the belts 37 and the carriages 26 together in a linear movement away from the front end 8 of the accumulator 1, which increases the length of the rectilinear sections 10, 11 of the chain 9 in the working areas 27 (while symmetrically decreasing it in the passive areas 28) and consequently increases the accumulation capacity.

According to a particular embodiment illustrated in FIGS. 8 to 11, the accumulator 1 is equipped with a lateral guide device 60 of the chain 9 at the entry and exit of the curved sections 12, 13, at the junction with the straight sections 10, 11.

Indeed, the passage of a link 9.1 from a rectilinear section 10, 11 to a curved section 12, 13—and reciprocally—is normally accompanied by a lateral offset movement (i.e., perpendicular to the direction of movement) of the link 9.1.

Said movement, localized but sharp, is due to the polygonal nature of the curved sections 12, 13 of the chain 9, the winding of which on the wheels 30 (respectively 31 and 55) is therefore not continuous but occurs in jolts, each link 9.1 coming into point (or quasi-point) contact with the wheel 30 (respectively 31 and 55) when entering the curved section 12, 13, the link 9.1 undergoing a pivoting movement around its vertical axis B.

It can be observed that this pivoting of the link 9.1 is accompanied by a tangential effort exerted by the wheel 30 (respectively 31 and 55) on the link 9.1 during their coupling, said tangential effort resulting in a localized but sharp variation of the tension in the chain 9. In steady-state operation (in other words, at stabilized speed of travel of the chain 9), these variations of tension cause jolts in the rectilinear sections 10, 11 of the chain 9.1—that is, a succession of acceleration-deceleration cycles—in the longitudinal direction of travel of the articles 2. Said jolts can destabilize the articles 2 or even cause them to fall, risking an emergency stop of the accumulator 1.

A lateral guide of the links 9.1 at the entrance and exit of the curved sections 12, 13, at the junction with the straight sections 10, 11, makes it possible to decrease or even eliminate the jolts.

Figure 8:
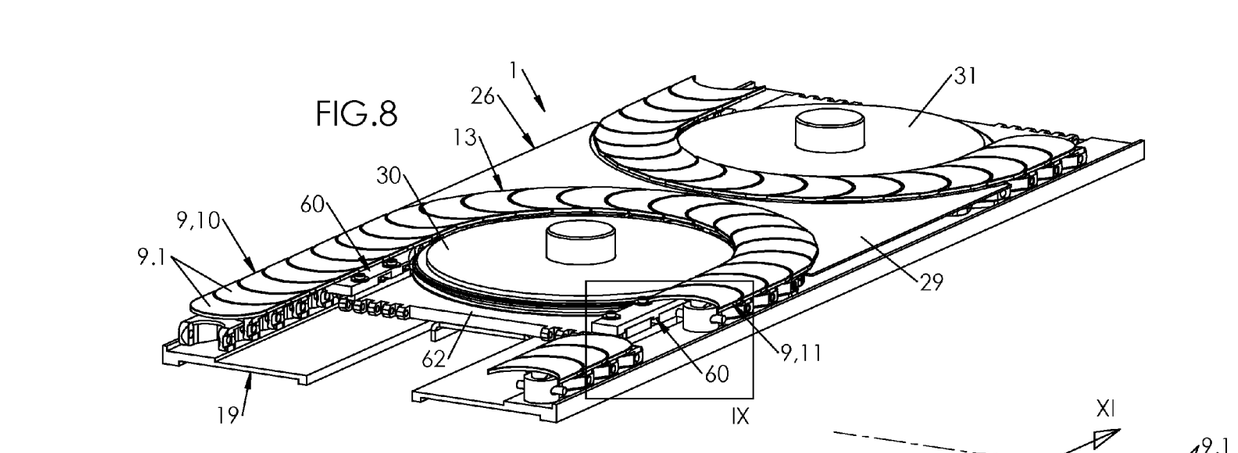
FIG. 8 is a view in perspective showing a detail of the conveyor according to one embodiment in which the carriage is equipped with a magnetic guide device.
Figure 9:
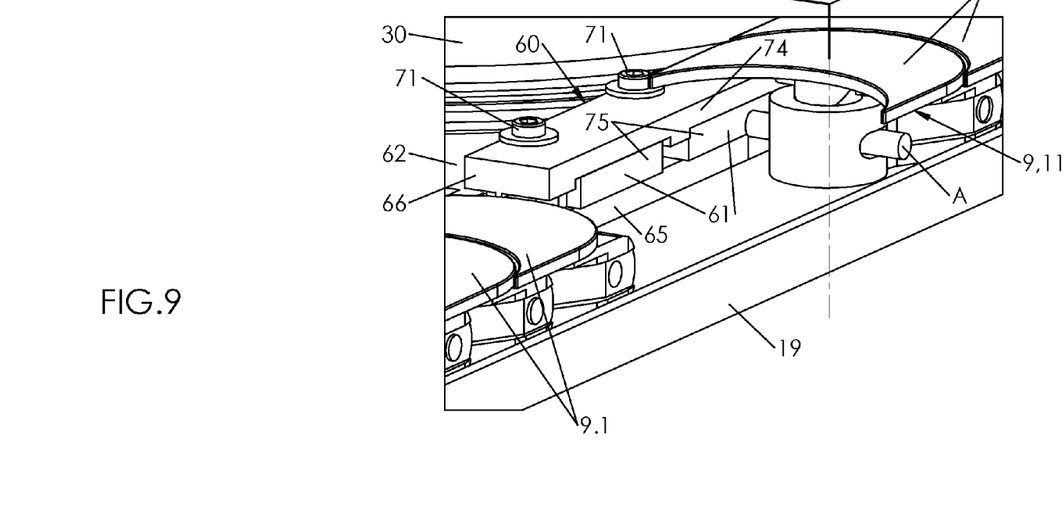
FIG. 9 is a detailed view of the conveyor, according to inset IX of FIG. 8.
Figure 10:
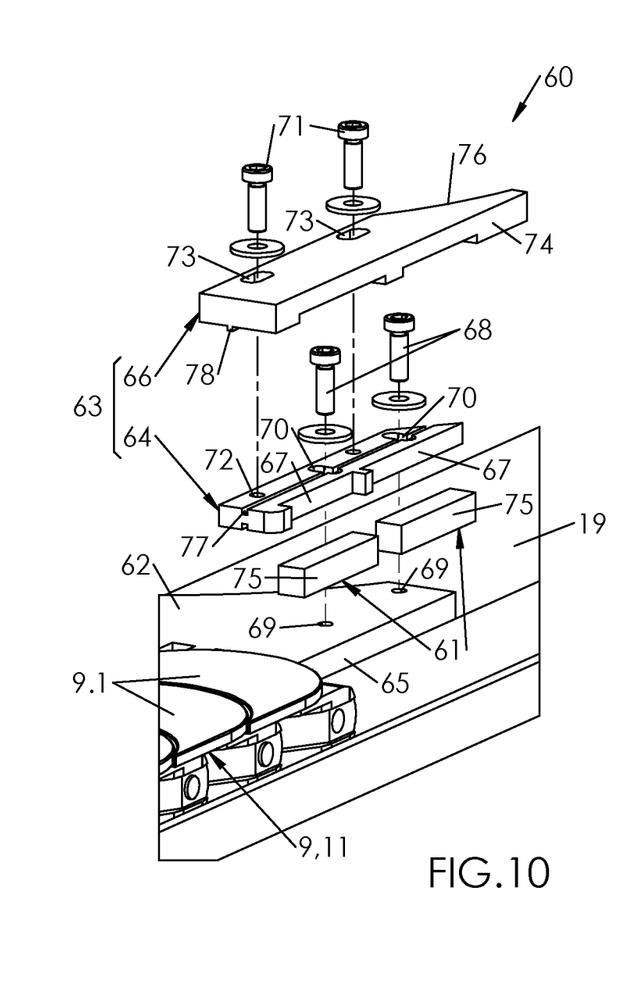
FIG. 10 is an exploded detailed view of the accumulator, illustrating the assembly of the magnetic guide device.

According to a preferred embodiment illustrated in FIGS. 8 to 11, the device 60 is magnetic. It comprises at least one permanent magnet 61 (and preferably a pair of permanent magnets 61, as can be seen in FIGS. 9 and 10) mounted on a plate 62 adjacent to the wheel 30 (respectively 31 and 55), at each end of the central belt 37, to exert a magnetic attraction on the horizontal pins A of the links 9.1. To that end, the pins A are made of a ferromagnetic material, for example mild steel.

In FIGS. 8 and 9, several links of the rectilinear section 11 of the chain 9 have been made invisible to show more clearly the guide device 60.

At each carriage 26, and as illustrated in FIG. 8, said plate 62 provides for attaching the central belt 37 to the carriage 26, and more specifically to the support plate 29. At each transfer device 53, the plate 62 is attached to the plate 54, or is composed of a part thereof situated between the wheel 55 and the end of the belt 37.

Figure 11:
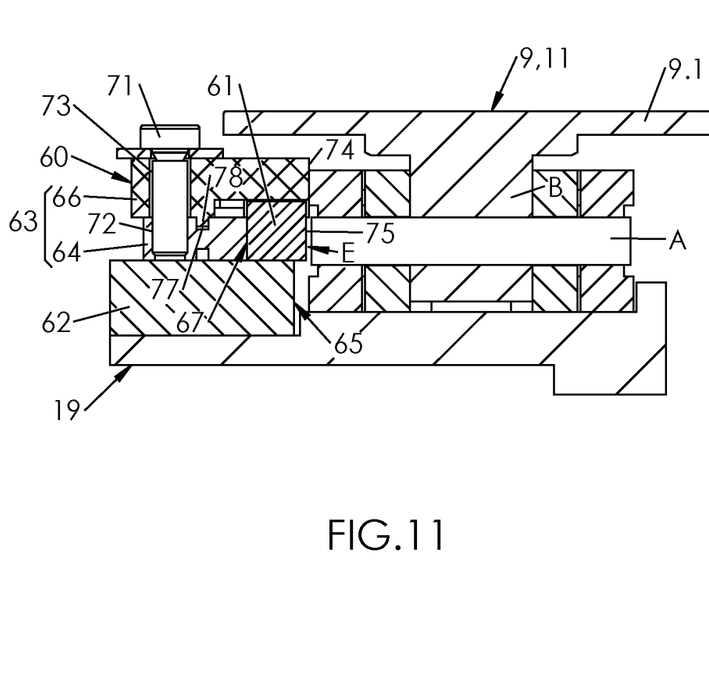
FIG. 11 is a detailed view in cross-section of the conveyor along plane XI of FIG. 9.

According to a preferred embodiment illustrated in FIG. 10, each magnet 61 is parallelepiped in shape, for example (as illustrated in FIG. 11), of square cross-section.

The device 60 comprises an attachment flange 63 for each magnet 61 on the plate 62. Said flange 63 comprises a lower clamping jaw 64, attached to the plate 62 near the lateral edge 65 thereof, and an upper clamping jaw 66 attached to the lower clamping jaw 64.

As can be seen in FIG. 10, which is an exploded view of the guide device 60 to illustrate its assembly, the lower clamping jaw 64, preferably made of a ferromagnetic material (such as mild steel) is provided with a housing 67 for each magnet 61. The magnetism is sufficient to ensure that each magnet 61 is held solidly on the lower clamping jaw 64.

The attachment of the lower clamping jaw 64 to the plate 62 is accomplished, for example, by means of a pair of bolts 68 screwed into threaded holes 69 made in the plate 62, through openings 70 made in the clamping jaw 64, with the interposition of washers. As illustrated in FIG. 10, said openings 70 are preferably oblong in the transverse direction, so as to allow the lateral displacement of the clamping jaw 64 with respect to the plate 62 and consequently the adjustment of the position of the device 60 in the transverse direction.

The attachment of the upper clamping jaw 66 to the lower clamping jaw 64 is accomplished, for example, by means of a second pair of bolts 71 screwed into threaded holes 72 made in the lower clamping jaw 64, through openings 73 made in the upper clamping jaw 66, with the interposition of washers.

According to one embodiment, the upper clamping jaw 66 is made of a non-magnetic material (particularly of a plastic material), preferably of low coefficient of friction, for example of Nylon® or equivalent. The upper clamping jaw 66 has an outer edge 74, which, in the normal position of use of the guide device 60, extends beyond the lateral edge 65 of the plate 62 and beyond the upper face or pole 75 of each magnet 61, turned towards the links 9.1.

Moreover, the upper clamping jaw 66 has a front end 76 that is beveled in an arc of circle, with a radius equal to or slightly greater than the radius of the wheel 30 (respectively 31, 55).

The openings 73 are preferably oblong in the transverse direction, so as to allow the lateral displacement of the upper clamping jaw 66 in the longitudinal direction, i.e., in the direction of movement of the chain 9 in the rectilinear section 10, 11.

The parallelism of the upper clamping jaw 66 and lower clamping jaw 64 (and therefore the parallelism of the outer edge 74 and of the pole 75 of each magnet 61) is ensured by means of a longitudinal guidance of the clamping jaws 64, 66, for example by a spline and channel system. For example, a longitudinal channel 77 is made in the lower clamping jaw 64, a complementary spline 78 being provided to project from a lower face of the upper clamping jaw 66.

By its magnetism, the lateral guide device 60 exerts a lateral pulling effort directed inwards on the pin A of each link 9.1 that passes in front of and at the level of the magnet 61. Because of the offset between the outer edge 74 of the upper clamping jaw 66 and the pole 75, a gap E is maintained between the pole 75 and the end of the pin A. The link 9.1 is thus pressed against the outer edge 74, on which it can slide with a minimum of friction.

The purpose of adjusting the position of the guide device 60 in the transverse direction is to ensure the tangency of the outer edge 74 of the upper clamping jaw 66 and of the outer diameter of the wheel 30 (respectively 30 [sic], 55), so as to limit (even eliminate) the lateral movements of the links 9.1 entering or exiting the curved section 12, 13.

Furthermore, the purpose of adjusting the position of the upper clamping jaw 66 in the longitudinal direction is to position the outer edge 74 of the clamping jaw 66 closest to the wheel 30 (respectively 31 or 55) in order to ensure a continuity of the lateral guidance of the links 9.1 at the junction between the rectilinear section 10, 11 and the curved section 12, 13.

The accumulator 1 that has just been described has the following advantages.

Firstly, the modular architecture makes it possible to manufacture accumulators 1 of different capacities and dimensions from the same identical and independent basic components (the modules). Because the modules 14 are removably attached to the infrastructure 15, it is further possible to modify the accumulator 1 either by eliminating one or more modules 14 in order to decrease the maximum accumulation capacity, or by adding one or more modules 14 in order to increase the maximum accumulation capacity.

Secondly, the modular architecture also facilitates the transport and assembly of the accumulator 1, each module 14, of small footprint and independent of the others, being transportable individually. In particular, it is possible to construct a very wide accumulator 1 (i.e., more than the nominal width of common tractor-trailers, 2,250 mm) that can be transported to the operation site in separate elements by one or more tractor-trailer(s), while a conventionally constructed single unit of equal width would require transportation by exceptional means.

Thirdly, the modular architecture also makes it possible to design accumulators of varied forms. In the example illustrated and described above, the accumulator 1 is straight, the modules 14 extending parallel to each other. This configuration is the simplest one, and makes it possible to have a common infrastructure for the modules 14 and the transfer devices 53.

However, other forms can be considered, in which the accumulation modules extend in non-parallel directions, such as star- or L-shaped, depending on the configuration of the installation site and the available space. These configurations can be accomplished with modules that are unchanged, but which need slight modifications to the infrastructure. Thus, an infrastructure can be provided in several different elements or connected to each other, preferably by removable attachment means. Each transfer device remains mounted between two adjacent modules (or successive modules, from the point of view of the track of the articles) for which it provides the interconnection, but its support plate is configured to adapt to the angle formed between the modules. For example, to interconnect two modules oriented at 90°, the support plate is provided with a groove extending over one-fourth of a circle.

Fourthly, the guidance of the chain 9, in the rectilinear sections 10, 11 by a lateral edge 38 of the belt 37, makes it possible to ensure a simple and effective lateral guidance of the chain 9 without forming an obstacle to the movement of the carriage 26. If the exterior guidance (in this instance provided by the rib 25) is of relatively simple design, the interior guidance, necessary to avoid any accidental derailing of the chain 9, poses a difficulty because it must allow the half-turn of the chain 9 around the wheels 30, 55 (and therefore the local deviation of the chain 9 of its rectilinear sections 10, 11), while allowing the linear movement of the carriage 26 to adapt the capacity of the accumulator to the need of storage of the articles 9. The proposed design solves these problems.

Fifthly, thanks to the lateral guide device 60, the transition between the straight sections 10, 11 and curved sections 12, 13 of the chain 9 is accomplished with no lateral movement, and thus with a minimum of jolts (even no jolts at all) in the chain 9. The result is a continuous, fluid movement of the articles 2, which makes it possible to increase the pace of accumulation without the risk of stopping the machine.

The invention claimed is:

1. An accumulation conveyor of articles by endless conveyor band, formed by assembling:
    a plurality of independent adjustable-capacity accumulation modules, each comprising a frame defining two parallel tracks respectively for an advance strand and a return strand of the band, wherein each module is juxtaposed and removably mounted on a common infrastructure, each frame is an independent frame structure, each module is removably attached to the common infrastructure by flanges, and each module is equipped with a movable carriage comprising a front wheel, the front wheel disposed between the advance strand and the return strand;
    at least one transfer device connecting a track for a return strand of the band to a first accumulation module of the accumulation modules and a track for an advance strand of the band to a second accumulation module of the accumulation modules, adjacent to the first;
    an endless conveyor band common to the accumulation modules, the transfer device, and the movable carriages; and
    wherein an accumulation capacity of each accumulation module is adjustable, at least one of independently or jointly, with the other accumulation modules.

2. The accumulation conveyor according to claim 1, wherein the transfer device is removably attached to the modules.

3. The accumulation conveyor according to claim 1, wherein the common infrastructure comprises a plurality of cross members on which the accumulation modules rest.

4. The accumulation conveyor according to claim 3, wherein the common infrastructure comprises legs attached to the cross members.

5. The accumulation conveyor according to claim 1, wherein the accumulation modules extend along parallel directions.

6. The accumulation conveyor according to claim 1, wherein each accumulation module comprises:
    two rectilinear sections, comprising the respective advance strand and return strand,
    a central belt extending between the rectilinear sections, the central belt attached by at least one end to the movable carriage,
    a motor engaged with the belt to jointly drive the belt and the corresponding movable carriage in a linear movement with respect to the rectilinear sections, and thus to modify the accumulation capacity of the module.

7. The accumulation conveyor according to claim 6, wherein the endless conveyor band is guided laterally by the central belt.

8. The accumulation conveyor according to claim 1, which comprises a lateral guide device of the band at a junction between a straight section and a curved section.

9. The accumulation conveyor according to claim 8, wherein the guide device is magnetic, and comprises at least one magnet situated at the level of metal parts of the band, passing in front of the magnet.

10. The accumulation conveyor according to claim 8, wherein the position of the guide device is adjustable in a longitudinal direction and a transverse direction.

11. The accumulation conveyor according to claim 8, wherein the guide device comprises a magnet mounting clamp, one jaw of which has an edge against which the band is applied and on which it slides.

12. The accumulation conveyor according to claim 8, wherein the guide device is mounted on a plate integral with a support of a transfer wheel of the band.

13. An accumulation conveyor-of articles by endless conveyor band, formed by assembling:
    a plurality of independent adjustable-capacity accumulation modules, each comprising a frame defining two parallel tracks respectively for an advance strand and a return strand of the band;
    at least one transfer device connecting the track for the return strand of the band to a first accumulation module of the accumulation modules and the track for the advance strand-of the band to a second accumulation module of the accumulation modules, adjacent to the first accumulation module;
    an endless conveyor band common to the first and second accumulation modules and to the transfer device;
    a lateral guide device of the endless conveyor band at a junction between a straight section and a curved section of the endless conveyor band, the lateral guide device further comprises a magnet and a mounting clamp, one jaw of which has an edge against which the endless conveyor band is applied and slides.

14. An accumulation conveyor of articles, comprising:
    a first accumulation module and a second accumulation module, each comprising a frame defining two parallel tracks, respectively, for an advance strand and a return strand, wherein each module is juxtaposed and removably mounted on a common infrastructure, each frame is an independent frame assembly; each module is removably attached to the common infrastructure by flanges; and each module is equipped with a movable carriage comprising a wheel disposed between the advance strand and the return strand;
    a transfer device connecting the return strand of the band to the first accumulation module and the advance strand-of the band to the second accumulation module adjacent to the first;
    an endless conveyor band common to the accumulation modules, the transfer device, and the movable carriages, and comprising the advance strand and the return strand of each accumulation module;

wherein an accumulation capacity of each accumulation module is adjustable, at least one of independently or jointly, with the other accumulation modules.

15. The accumulation conveyor according to claim 14, further comprising a motor that drives the movable carriage in a linear direction parallel to the advance strand and the return strand, which thereby adjusts the accumulation capacity of the module.

* * * * *